(12) United States Patent
Forster

(10) Patent No.: US 12,056,554 B2
(45) Date of Patent: Aug. 6, 2024

(54) STRAP MOUNTING TECHNIQUES FOR WIRE FORMAT ANTENNAS

(71) Applicant: AVERY DENNISON RETAIL INFORMATION SERVICES, LLC, Mentor, OH (US)

(72) Inventor: Ian J. Forster, Chelmsford (GB)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 16/148,183

(22) Filed: Oct. 1, 2018

(65) Prior Publication Data
US 2019/0102666 A1  Apr. 4, 2019

Related U.S. Application Data

(60) Provisional application No. 62/565,573, filed on Sep. 29, 2017.

(51) Int. Cl.
*G06K 19/07* (2006.01)
*G06K 19/077* (2006.01)
(Continued)

(52) U.S. Cl.
CPC ... *G06K 19/07773* (2013.01); *G06K 19/0775* (2013.01); *G06K 19/07752* (2013.01);
(Continued)

(58) Field of Classification Search
CPC .... H01L 2224/45015; G06K 19/07749; G06K 19/0775; G06K 19/07745; G06K 19/077; G06K 19/07722
See application file for complete search history.

(56) References Cited

U.S. PATENT DOCUMENTS 3,239,396 A   3/1966 Bohannon, Jr.
5,525,175 A   6/1996 Blenke et al.
(Continued)

FOREIGN PATENT DOCUMENTS

CN   1839399 A  *  9/2006  ............. B29C 70/82
CN   101467163      6/2009
(Continued)

OTHER PUBLICATIONS

"https://www.hitachi.com/New/cnews/060206.html", retrieved 2022, published Feb. 2006 (Year: 2006).*
(Continued)

*Primary Examiner* — Christopher Stanford

(57) ABSTRACT

An RFID device includes an antenna defining a gap, with an RFID chip electrically coupled to the antenna across the gap. The RFID chip may be incorporated into an RFID strap, in which a pair of connection pads is connected to the RFID chip, with the connection pads connected to the antenna on opposite sides of the gap. Alternatively, the antenna may be connected to bond pads of the RFID chip. At least a portion of the antenna has a cross section with an at least partially curved perimeter. The cross section of the antenna may be differently shaped at different locations, such as having a flattened oval shape at one location and a substantially circular shape at another location. A portion of the cross section of the antenna may have a non-curved, relatively sharp edge, which may break through an outer oxide layer of a connection pad.

23 Claims, 3 Drawing Sheets

(51) Int. Cl.
*H01Q 1/14* (2006.01)
*H01Q 1/22* (2006.01)

(52) U.S. Cl.
CPC . *G06K 19/07754* (2013.01); *G06K 19/07756* (2013.01); *H01Q 1/14* (2013.01); *H01Q 1/2225* (2013.01)

(56) References Cited

U.S. PATENT DOCUMENTS

| | | | |
|---|---|---|---|
| 6,107,920 | A | 8/2000 | Eberhardt et al. |
| 6,142,381 | A * | 11/2000 | Finn ................ G06K 19/07743 235/441 |
| 6,161,761 | A * | 12/2000 | Ghaem ............ G06K 19/07749 235/380 |
| 6,206,292 | B1 | 3/2001 | Robertz et al. |
| 6,262,692 | B1 | 7/2001 | Babb |
| 6,523,734 | B1 * | 2/2003 | Kawai .............. G06K 19/07718 156/73.1 |
| 6,604,686 | B1 | 8/2003 | Taban |
| 7,646,304 | B2 | 1/2010 | Cote et al. |
| 8,067,253 | B2 * | 11/2011 | Ferguson ......... G06K 19/07752 438/26 |
| 8,068,031 | B2 | 11/2011 | Forster |
| 8,142,590 | B2 | 3/2012 | Rajala et al. |
| 8,522,431 | B2 * | 9/2013 | Finn ........................ H01Q 7/00 29/829 |
| 8,640,965 | B2 * | 2/2014 | Sutera ............. G06K 19/07728 235/492 |
| 8,673,777 | B2 | 3/2014 | Black et al. |
| 9,469,094 | B2 | 10/2016 | Previty et al. |
| 9,595,501 | B1 * | 3/2017 | Neuman .................. H05K 3/32 |
| 9,633,303 | B2 * | 4/2017 | Pueschner ........ G06K 19/07745 |
| 9,652,705 | B1 | 5/2017 | Lindblad et al. |
| 9,792,543 | B2 * | 10/2017 | Kuschewski ...... G06K 19/0775 |
| 10,115,050 | B2 * | 10/2018 | Gragnic ........... G06K 19/07754 |
| 10,127,490 | B2 * | 11/2018 | Gragnic ........... G06K 19/07754 |
| 10,320,066 | B2 * | 6/2019 | Gragnic .............. H01Q 1/2216 |
| 10,380,477 | B2 | 8/2019 | Pueschner |
| 2005/0001785 | A1 | 1/2005 | Ferguson ......... G06K 19/07745 343/895 |
| 2005/0072512 | A1 | 4/2005 | Shiomi et al. |
| 2006/0054707 | A1 * | 3/2006 | Akita .............. G06K 19/07749 235/492 |
| 2006/0285301 | A1 * | 12/2006 | Provost ........... G06K 19/07749 361/737 |
| 2007/0040037 | A1 | 2/2007 | Koda et al. |
| 2008/0099132 | A1 | 5/2008 | Moertl |
| 2008/0117056 | A1 | 5/2008 | Forster |
| 2008/0155822 | A1 * | 7/2008 | Finn ................ G06K 19/07745 29/832 |
| 2008/0179404 | A1 * | 7/2008 | Finn ................ G06K 19/07745 235/492 |
| 2008/0283615 | A1 * | 11/2008 | Finn ...................... G06K 19/077 235/488 |
| 2011/0023289 | A1 * | 2/2011 | Finn ................ G06K 19/07722 29/601 |
| 2012/0217309 | A1 * | 8/2012 | Droz ................ G06K 19/07749 235/492 |
| 2014/0354490 | A1 * | 12/2014 | Michalk .................. H01L 24/92 343/702 |
| 2015/0161501 | A1 * | 6/2015 | Krull ............... G06K 19/07754 361/764 |
| 2016/0224882 | A1 * | 8/2016 | Zhang .............. G06K 19/0775 |
| 2017/0062904 | A1 | 3/2017 | Matsumura et al. |
| 2017/0206448 | A1 * | 7/2017 | Pueschner .......... G06K 19/0776 |

FOREIGN PATENT DOCUMENTS

| | | | | |
|---|---|---|---|---|
| CN | 101933034 | A * | 12/2010 | ....... G06K 19/07743 |
| CN | 101999130 | | 3/2011 | |
| CN | 103958725 | | 7/2014 | |
| CN | 105263700 | | 1/2016 | |
| DE | 102004045896 | B4 * | 1/2007 | ....... G06K 19/07749 |
| DE | 102007037167 | A1 * | 2/2009 | ....... G06K 19/07749 |
| EP | 1816592 | | 8/2007 | |
| EP | 2175400 | | 4/2010 | |
| EP | 2221751 | A1 * | 8/2010 | ....... G06K 19/07728 |
| GB | 2372012 | | 8/2002 | |
| KR | 20030024388 | A * | 3/2003 | |
| KR | 101086381 | B1 * | 11/2011 | |
| WO | 02/25825 | | 3/2002 | |
| WO | 03/032115 | | 4/2003 | |
| WO | WO-2011118905 | A2 * | 9/2011 | ............... B32B 7/12 |
| WO | WO-2016001569 | A1 * | 1/2016 | ......... G06K 19/0775 |
| WO | 2014/008937 | | 5/2017 | |

OTHER PUBLICATIONS

International Search Report and Written Opinion dated Mar. 11, 2019 issued in corresponding IA No. PCT/US2018/053696 filed Oct. 1, 2018.

International Preliminary Report on Patentability dated Mar. 31, 2020 issued in corresponding IA No. PCT/US2018/053696 filed Oct. 1, 2018.

* cited by examiner

STRAP MOUNTING TECHNIQUES FOR WIRE FORMAT ANTENNAS

CROSS-REFERENCE TO RELATED APPLICATION(S)

The present application claims priority to and the benefit of U.S. Provisional Patent Application No. 62/565,573 filed Sep. 29, 2017, which is incorporated herein by reference in its entirety.

BACKGROUND

Field of the Disclosure

The present subject matter relates to radio frequency identification ("RFID") devices. More particularly, the present subject matter relates to techniques for mounting RFID straps to wire format antennas.

Description of Related Art

RFID tags and labels (collectively referred to herein as "devices") are widely used to associate an object with an identification code. RFID devices generally have a combination of antennas and analog and/or digital electronics, which may include, for example, communications electronics, data memory, and control logic. For example, RFID tags are used in conjunction with security locks in cars, for access control to buildings, and for tracking inventory and parcels. Some examples of RFID tags and labels appear in U.S. Pat. Nos. 6,107,920; 6,206,292; and 6,262,692, each of which is hereby incorporated herein by reference in its entirety.

One difficulty associated with manufacturing RFID devices is the need to impart some minimum degree of flexibility and durability. A typical RFID device includes an RFID chip (which may include an integrated circuit) electrically coupled to an antenna, which is capable of sending signals to and/or receiving signals from an RFID reader within range of the RFID device. The antenna is commonly formed of a conductive material (e.g., silver, copper or aluminum) and configured as a thin, flat element, which may be formed by being printed or placed onto a substrate, and then cut, by such methods as die or laser cutting onto a base substrate (e.g., a paper or fabric or plastic material) of the RFID device. While such an antenna may have the required flexibility, it may be advantageous to provide an antenna having improved durability.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

In one aspect of the disclosure, an RFID device includes an antenna defining a gap, with an RFID chip electrically coupled to the antenna across the gap. At least a portion of the antenna has a cross section with an at least partially curved perimeter. The entire perimeter of the cross section may be curved, such as a cross section with a substantially circular shape. The cross section of the antenna may vary, such as with a flattened oval shape at one location (e.g., a location at which the antenna crosses a connection pad associated with the RFID chip) and a substantially circular shape at another location. The antenna may be connected to a connection pad or bond pad using any suitable approach, such as adhesion or welding, with the pad optionally deformed about the antenna.

In another aspect of the disclosure, an RFID device includes an antenna defining a gap, with an RFID chip electrically coupled to the antenna across the gap. At least a portion of the antenna has a cross section with an at least partially curved perimeter. The entire perimeter of the cross section may be curved, such as a cross section with a substantially circular shape. The cross section of the antenna may vary, such as with a flattened oval shape at one location (e.g., a location at which the antenna crosses a connection pad associated with the RFID chip) and a substantially circular shape at another location. The cross section of the antenna may also or alternatively be shaped with at least one non-curved edge, which can extend through an outer oxide layer of a connection pad to which the antenna is connected.

In a further aspect of the disclosure, an RFID device includes an antenna defining a gap, with an RFID chip electrically coupled to the antenna across the gap. At least a portion of the antenna has a cross section with an at least partially curved perimeter. The entire perimeter of the cross section may be curved, such as a cross section with a substantially circular shape. The cross section of the antenna may vary, such as with a flattened oval shape at one location (e.g., a location at which the antenna crosses a connection pad associated with the RFID chip) and a substantially circular shape at another location. The antenna may be connected to a connection pad or bond pad using any suitable approach, such as adhesion or welding, with the antenna crossing the connection pad or bond pad at one or more locations, with the pad optionally deformed about the antenna.

In an additional aspect of the disclosure, an RFID device includes an antenna defining a gap, with an RFID chip electrically coupled to the antenna across the gap. At least a portion of the antenna has a cross section with an at least partially curved perimeter. The entire perimeter of the cross section may be curved, such as a cross section with a substantially circular shape. The cross section of the antenna may vary, such as with a flattened oval shape at one location (e.g., a location at which the antenna crosses a connection pad associated with the RFID chip) and a substantially circular shape at another location. The antenna may be connected to a connection pad or bond pad using any suitable approach, such as adhesion or welding, with the pad optionally deformed about the antenna. A conductive material, such as a conductive adhesive or solder, is used to connected the antenna to the connection pad or bond pad.

In another aspect of the disclosure, an RFID device includes an antenna defining a gap, with an RFID chip electrically coupled to the antenna across the gap. At least a portion of the antenna has a cross section with an at least partially curved perimeter. The entire perimeter of the cross section may be curved, such as a cross section with a substantially circular shape. The cross section of the antenna may vary, such as with a flattened oval shape at one location (e.g., a location at which the antenna crosses a connection pad associated with the RFID chip) and a substantially circular shape at another location. The antenna is connected to a connection pad or bond pad using any suitable approach, such as adhesion or welding, with the pad optionally deformed about the antenna, and with the RFID chip and the antenna being electrically coupled to opposite surfaces of the connection pad or bond pad.

DESCRIPTION OF THE ILLUSTRATED EMBODIMENTS

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

Figure 1:
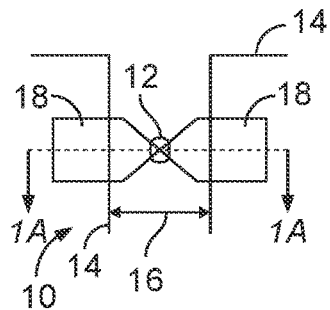
FIG. 1 is a top plan view of an RFID device according to an aspect of the present disclosure.

FIG. 1 illustrates an embodiment of an RFID device (generally identified at 10) according to an aspect of the present disclosure. The RFID device 10 includes an RFID chip 12, which may be variously configured without departing from the scope of the present disclosure. The RFID chip 12 is electrically coupled to an antenna 14, with the RFID chip 12 being electrically coupled to the antenna 14 across a gap 16 defined by the antenna 14. In the embodiment of FIG. 1, the RFID chip 12 is incorporated into an RFID strap, which includes a pair of connection pads 18 formed of a conductive material (e.g., aluminum) and electrically coupled to the RFID chip 12 and to the antenna 14, with each connection pad 18 associated with different portions of the antenna 14, across the gap 16. It should be understood that the illustrated embodiment is merely exemplary and that the RFID chip 12 may be electrically coupled to the antenna 14 by any other suitable means.

Figure 1A:
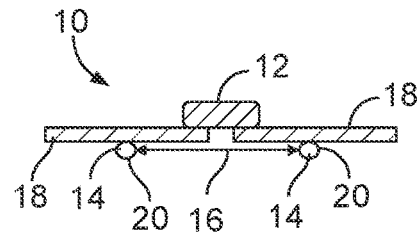
FIG. 1A is a cross-sectional view of the RFID device of FIG. 1, taken through line 1A-1A of FIG. 1.

As can be seen in FIG. 1A, at least a portion of the antenna 14 has a cross section with an at least partially curved perimeter 20. In the illustrated embodiment, the antenna 14 is formed of a conductive wire or thread having a substantially circular cross sectional shape (i.e., the entire perimeter 20 is curved). Wire, particularly wire having a circular cross section, is flexible and may be formed of a material allowing it to be deformed many times without fracturing or breaking, thereby improving the durability of the antenna 14 compared to the antenna of a conventional RFID device. For example, the antenna 14 may be formed of a copper wire, which may be plated with one or more other materials (e.g., silver or gold) to prevent corrosion and/or to improve joints. The gauge of the wire (and, hence, the diameter of the cross section of the antenna 14) may vary, depending on the particular characteristics desired for the resulting RFID device, with a thicker wire being selected for improved durability and a thinner wire being selected for improved flexibility.

Figure 2:
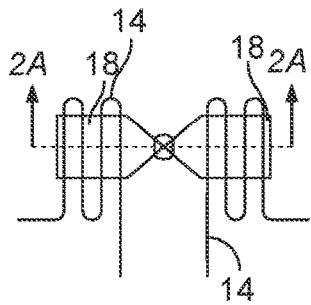
FIG. 2 is a top plan view of another embodiment of an RFID device according to an aspect of the present disclosure.
Figure 2A:
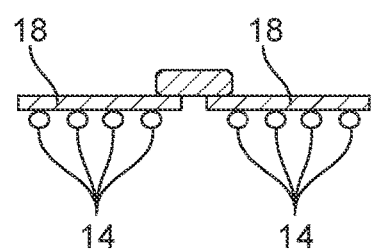
FIG. 2A is a cross-sectional view of the RFID device of FIG. 2, taken through line 2A-2A of FIG. 2.

In the embodiment of FIGS. 1 and 1A, the antenna 14 crosses and is connected to each connection pad 18 at only one location, with the antenna 14 and the RFID chip 12 electrically coupled to opposing surfaces of the connection pads 18 (i.e., with the RFID chip 12 associated with an upper surface of the connection pads 18 and the antenna 14 associated with a lower surface of the connection pads 18 in the orientation of FIG. 1A). In other embodiments, as in the embodiment of FIGS. 2 and 2A, an antenna 14 may cross each connection pad 18 of an RFID strap (or whatever other component of the RFID device to which the antenna is joined) at a plurality of locations. While FIGS. 2 and 2A show an antenna 14 crossing each associated connection pad 18 of a strap 18 at four locations, the antenna 14 may cross each connection pad 18 of the strap any of a number of times without departing from the scope of the present disclosure. While crossing and being connected at multiple locations increases the length of the antenna 14 (and, hence, the cost of the RFID device), such a configuration may be advantageous for improving the connection and reliability of the joint between the antenna 14 and the component to which it is joined (the connection pads 18 in the illustrated embodiment).

Figure 3:
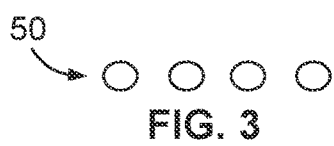
FIG. 3 is a cross-sectional view of an antenna according to an aspect of the present disclosure, in a pre-processed condition.
Figure 3A:
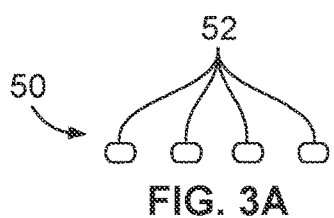
FIG. 3A is a cross-sectional view of the antenna of FIG. 3, in a processed condition.

A circular cross sectional shape may be advantageous for uniform flexibility and durability in any bending direction, but it should be understood that the shape of the cross section of the antenna may vary without departing from the scope of the present disclosure. For example, the curvature of the perimeter of the cross section of the antenna may vary, rather than being constant or uniform (as in a cross section having a substantially circular shape). In one embodiment, a portion of the antenna 50 may have a flattened oval shape, which may be formed by compressing a wire having a substantially circular cross section (compare FIGS. 3 and 3A) by a stamping or rolling procedure or by any other suitable manufacturing method. As used herein, the phrase "flattened oval shape" refers to a shape in which at least two surfaces of the perimeter of the shape have differing curvature, rather than the perimeter having a uniform curvature. More particularly, a "flattened oval shape" has a perimeter in which one "flattened" surface (but optionally opposing surfaces, such as the upper and lower surfaces in the orientation of FIG. 3A) is substantially flat or planar or at least has a curvature that is less than the curvature of another surface of the perimeter (e.g., the left and right surfaces of the perimeter of the antenna 50 of FIG. 3A). If the antenna 50 has opposing "flattened" surfaces, as in FIG. 3A, the opposing surfaces may have the same curvature (e.g., with each being substantially planar) or may have different curvatures (e.g., with an upper surface being substantially planar and a lower surface having some degree of curvature).

In such an embodiment, the cross section of the entire antenna 50 may have a flattened oval shape or may have a flattened oval shape in one or more locations and a different shape (e.g., substantially circular) in another location. It may be advantageous, for example, for the antenna 50 to have a flattened oval shape in the location or locations at which the antenna 50 is joined to a connection pad or some other component of an RFID device, with a flattened surface 52 of the antenna 50 contacting the other component. A flattened oval shape may be advantageous in a joint because the flattened surface 52 of the perimeter increases the contact area between the antenna 50 and the component to which it is joined compared to the contact area between a curved surface (of the antenna) and a flat surface (e.g., of a connection pad).

In another embodiment, the perimeter of the antenna 100a may have one or more non-curved sections, each configured as a relatively sharp edge. In such an embodiment, the edge is oriented to contact the surface of the component to which the antenna is joined, which may be, for example, a connection pad 102. When a joint is formed between the antenna 100a and the other component, the edge breaks through an outer surface or layer of the other component (e.g., an outer oxide layer of a connection pad 102 formed of an aluminum material) to provide a reliable conductive connection. This may also serve to more securely connect the antenna 100a to the other component, by adding a friction fit to the selected joinder method.

Figures 4A, 4B:
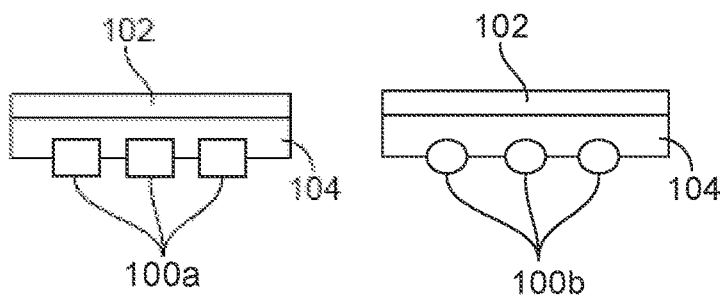
FIG. 4A is a representation of an RFID device according to an aspect of the present disclosure.
FIG. 4B is a cross-sectional, detail view of a portion of another embodiment of an RFID device according to an aspect of the present disclosure.

The antenna may be joined to the associated connection pad or other component of the RFID device by any suitable approach. For example, in the embodiment of FIG. 4B, an antenna 100b according to the present disclosure is connected to a connection pad 102 using a conductive material 104, such as a conductive adhesive or solder. Exemplary conductive material 104 includes epoxy adhesives loaded with a conductive particle, such as silver flakes (commonly referred to as isotropic conductive adhesives), or an anisotropic conductive adhesive. In such embodiments, the joint between the antenna 100 and the other component of the RFID device (with the conductive material 104 positioned therebetween) is formed when pressure is applied as part of the curing process.

Figure 5:
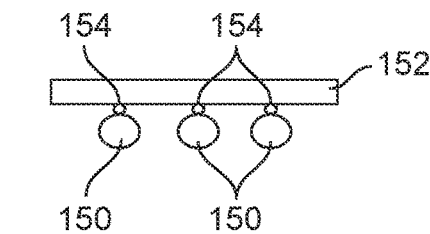
FIG. 5 is a cross-sectional, detail view of a portion of another embodiment of an RFID device according to an aspect of the present disclosure.

FIG. 5 illustrates another approach to joining an antenna 150 to another component (e.g., a connection pad) of an RFID device. In the embodiment of FIG. 5, an antenna 150 according to the present disclosure is connected to a connection pad 152 using a weld 154. The weld 154 may be formed by any suitable method, including ultrasonic welding, thermo-compression welding, and electrical welding.

Figure 6:
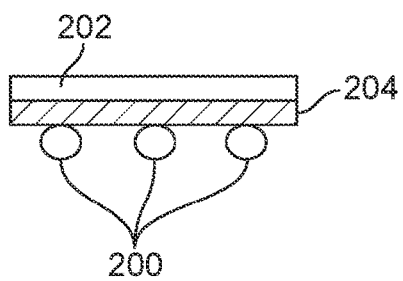
FIG. 6 is a cross-sectional, detail view of a portion of a further embodiment RFID device according to an aspect of the present disclosure.

While the joinder techniques of FIGS. 4 and 5 may be considered examples of "conductive" coupling (in that the antenna is electrically coupled to another component of the RFID device via conductance), it is also within the scope of the present disclosure for an antenna to be electrically coupled to another component of an RFID device via capacitance. For example, in the embodiment of FIG. 6, an antenna 200 according to the present disclosure is connected to a connection pad 202 using a non-conductive adhesive material 204, which may be a pressure-sensitive adhesive. By employing a non-conductive adhesive (in contrast to the embodiment of FIG. 4), there is no conductive coupling between the antenna 200 and the connection pad 202, but rather a capacitive coupling. In one embodiment, the adhesive material 204 may be sufficiently flexible so as to allow relative movement between the antenna 200 and the connection pad 202 in the joint. This is also true of the conductive material 104 of FIG. 4 as, in either embodiment, it may be advantageous to allow a degree of movement between the antenna and the component to which it is joined, while maintaining the two components in close proximity to each other.

Figure 7:
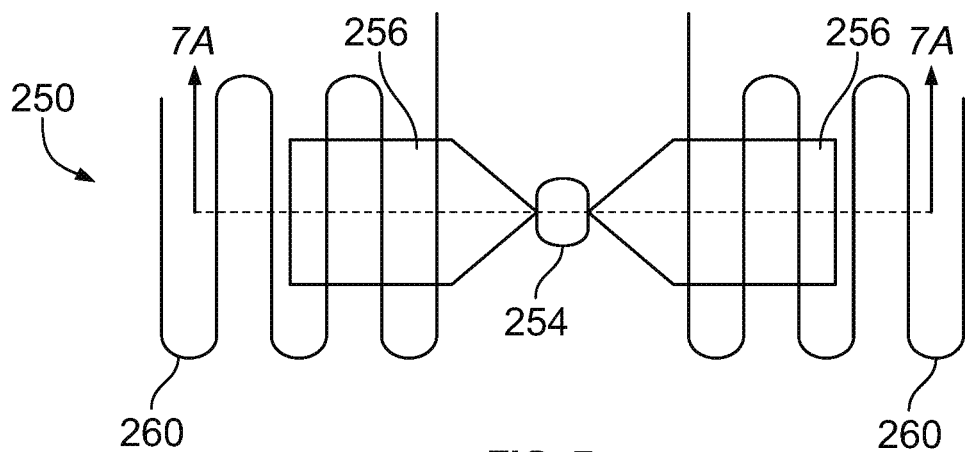
FIG. 7 is a top plan view of an RFID device according to an aspect of the present disclosure.
Figure 7A:
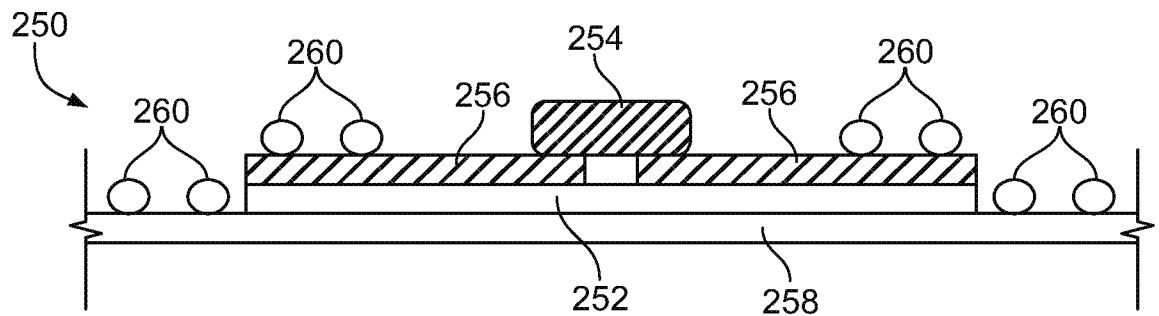
FIG. 7A is a cross-sectional view of the RFID device of F. 7, taken through line 7A-7A of FIG. 7.

While FIGS. 1-2A and 4-6 illustrate embodiments in which an RFID chip and an antenna are electrically coupled to opposing surfaces of a component (e.g., with the RFID chip electrically coupled to an upper surface of a connection pad and an antenna electrically coupled to a lower surface of the same connection pad), it should be understood that an RFID and antenna according to the present disclosure may be electrically coupled to the same surface of a third component (e.g., a connection pad) of an RFID device, as shown in FIGS. 7 and 7A. In the RFID device of FIGS. 7 and 7A (generally identified at 250), the base 252 of an RFID strap (also including an RFID chip 254 and a pair of connection pads 256) is secured to a substrate 258 (e.g., a fabric or paper or plastic material) prior to application of an antenna 260. With the RFID strap in place, the antenna 260 is then secured to upper surfaces of the connection pads 256 (i.e., the same surfaces to which the RFID chip 254 is connected) and to the substrate 258 at locations spaced away from the RFID strap. The connection between the antenna 260 and the connection pads 256 and between the antenna 260 and the substrate 258 may be made by any suitable approach, including those approaches described herein.

Figure 8:
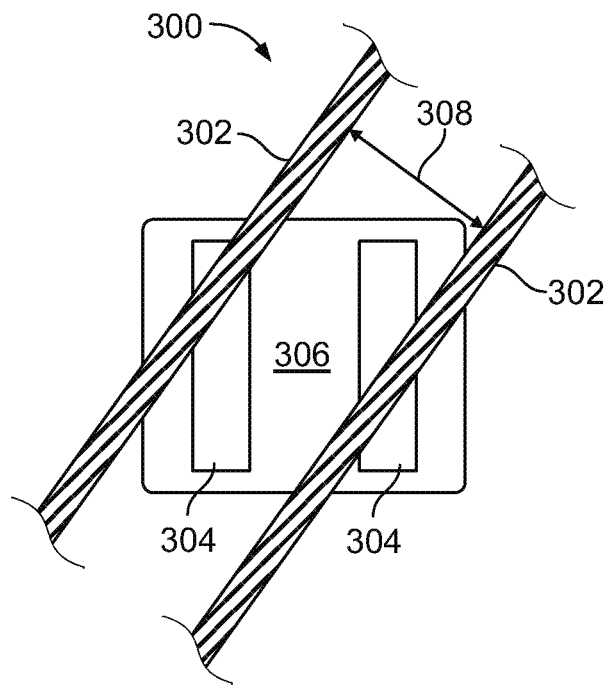
FIG. 8 is a top plan, detail view of a portion of an RFID device according to an aspect of the present disclosure.
Figure 8A:
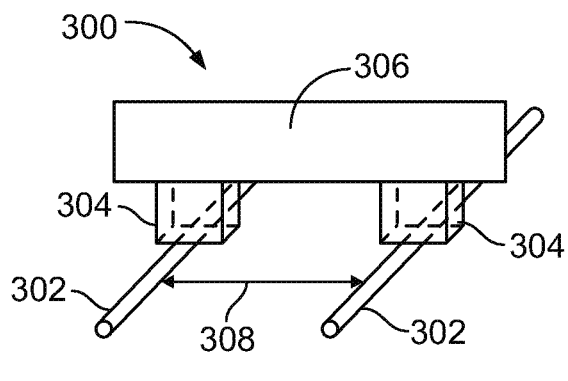
FIG. 8A is a perspective view of the RFID device of FIG. 8.
Figure 8B:
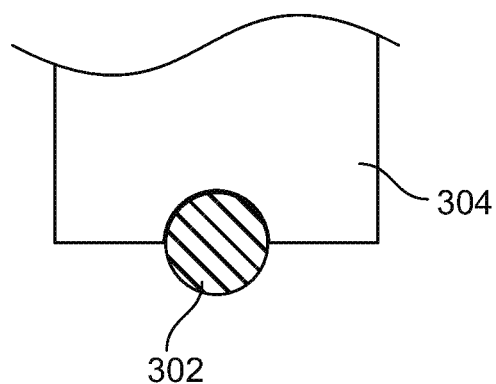
FIG. 8B is an end, detail view of a portion of the RFID device of FIG. 8.

FIGS. 8-8B illustrate an embodiment of an RFID device (generally identified at 300) in which an antenna 302 according to the present disclosure is connected to a component other than a connection pad of an RFID strap. In particular, in the illustrated embodiment, the antenna 302 is connected to a pair of bond pads 304 of an RFID chip 306, across a gap 308 defined by the antenna 302. The connection between the antenna 302 and the bond pads 304 may be made by any suitable approach, including those approaches described herein. While FIGS. 8-8B show the antenna 302 being connected to each bond pad 304 at only one location, it should be understood that the antenna 302 may be connected to a bond pad 304 at a plurality of locations.

The illustrated bond pads 304 are relatively small (e.g., being smaller than the associated RFID chip 306), compared to the connection pads to which an antenna is connected in the other embodiments described herein. Thus, connecting the antenna 302 to relatively small bond pads 304 instead of larger connection pads may allow for a more compact RFID device 300, such that the embodiment of FIGS. 8-8B may be particularly advantageous in applications requiring a relatively small RFID device 300.

Depending on the material composition of the bond pads 304, connecting the antenna 302 to a bond pad 304 may include deforming the bond pad 304 about the antenna 302 (as in FIG. 8B), thereby increasing the contact area between the bond pad 304 and the antenna 302 and resulting in a strong, low resistance connection. This may include either forming a groove in the bond pad 304 before inserting a portion of the antenna 302 into the groove or pressing the antenna 302 into the bond pad 304 to deform the bond pad 304 around the antenna 302. If a deformation is defined in the bond pad 304 prior to the antenna 302 being associated with the bond pad 304, then the deformation may help to align the antenna 302 during assembly of the RFID device.

Figure 9:
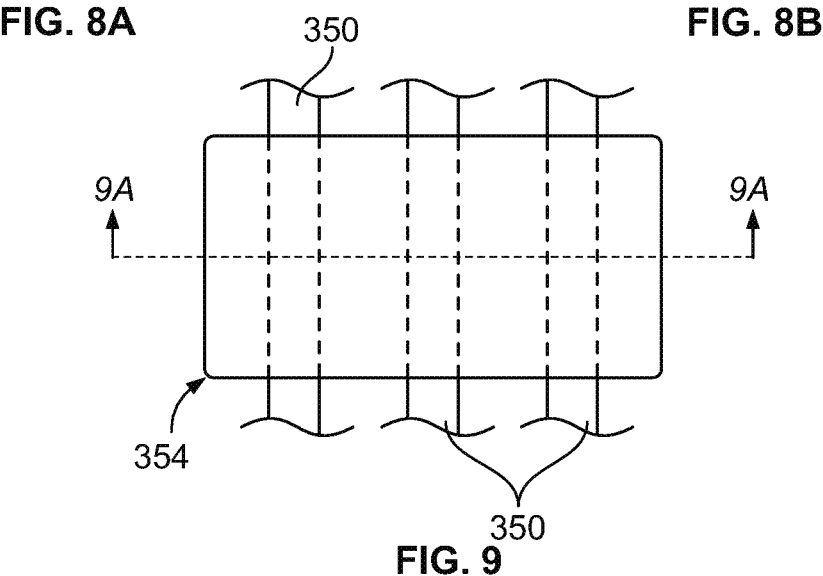
FIG. 9 is a top plan, detail view of a portion of an RFID device according to an aspect of the present disclosure.
Figure 9A:
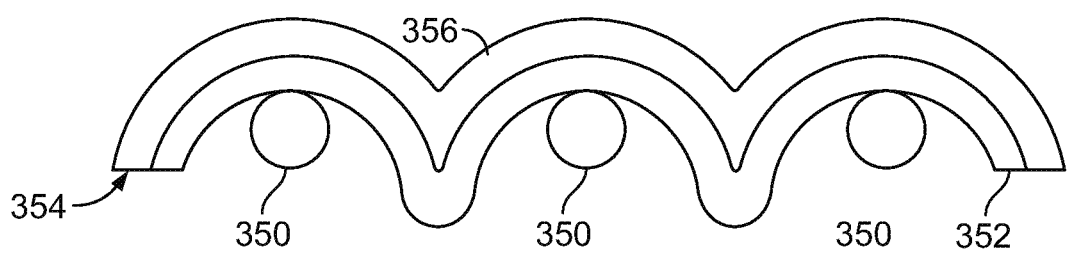
FIG. 9A is cross-sectional view of the RFID device of FIG. 9, taken through line 9A-9A of FIG. 9.

The concept of deforming a component around the antenna may be applied in other embodiments as well. For example, FIGS. 9 and 9A illustrate an RFID device in which an antenna 350 is connected to a metal layer 352 of an RFID strap 354 also having a plastic layer 356. In the illustrated embodiment, the antenna 350 crosses and is connected to the RFID strap 354 at three locations, but it should be understood that the antenna 350 may cross and be connected to the RFID strap 354 at more or fewer than three locations. The RFID strap 354 is deformed about the antenna 350 at each location where the antenna 350 crosses and is connected to the RFID strap 354, such that a portion of the antenna 350 is seated within a groove or channel defined in the RFID strap 354, making an electrical and mechanical joint and increasing the contact area between the antenna 350 and the RFID strap 354. The deformations in the RFID strap 354 may be achieved using any suitable approach, such as through the use of a heated or shaped roller or by heating the antenna 350 (e.g., using an electrical current) before pressing the RFID strap 354 against it. If the deformations are defined in the RFID strap 354 prior to the antenna 350 being associated with the RFID strap 354, then the deformations may help to align the antenna 350 during assembly of the RFID device.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. A radio frequency identification (RFID) device, comprising:
an antenna defining a gap;
an RFID strap comprising a pair of connection pads electrically coupled to the antenna, wherein the antenna crosses each of the connection pads at a plurality of locations, and wherein the antenna extends beyond opposite sides of the connection pad at each location where the antenna crosses each connection pad; and
an RFID chip incorporated into the RFID strap, the RFID chip being electrically coupled to the pair of connection pads, and the RFID chip being electrically coupled to the antenna through the pair of connection pads, each of the connection pads being larger than the RFID chip, wherein the RFID chip is disposed between at least two of the plurality of locations where the antenna crosses the pair of connection pads, and wherein the RFID strap is secured to a substrate prior to securing the antenna on the pair of connection pads and prior to securing the antenna on the substrate at a location separate from the RFID strap.

2. The RFID device of claim 1, wherein the entire antenna has a cross section with an at least partially curved perimeter.

3. The RFID device of claim 2, wherein the entire perimeter of the cross section is curved.

4. The RFID device of claim 2, wherein the cross section is substantially circular.

5. The RFID device of claim 2, wherein the cross section has a flattened oval shape.

6. The RFID device of claim 1, wherein
a cross section of the antenna has a flattened oval shape at a location where the antenna crosses the connection pad, and
the cross section of the antenna is substantially circular at a location spaced away from the connection pad.

7. The RFID device of claim 1, the connection pad being formed of an aluminum material and having an outer oxide layer, wherein a cross section of the antenna has at least one sharp edge extending through the outer oxide layer.

8. The RFID device of claim 1, further comprising
a conductive material connected to the connection pad and to the antenna.

9. The RFID device of claim 8, wherein said conductive material comprises a conductive adhesive or solder.

10. The RFID device of claim 1, further comprising
a weld connected to the connection pad and to the antenna.

11. The RFID device of claim 10, wherein the weld is formed from a method selected from the group consisting of ultrasonic, thermo-compression, and electrical welding.

12. The RFID device of claim 1, further comprising
an adhesive layer connected to the connection pad and to the antenna at a joint, wherein the antenna is electrically coupled to the connection pad by capacitance.

13. The RFID device of claim 12, where the adhesive layer comprises a non-conductive adhesive material.

14. The RFID device of claim 12, wherein the adhesive layer is sufficiently flexible to allow relative movement of the antenna and the connection pad in the joint.

15. The RFID device of claim 1, wherein the RFID chip and the antenna physically contact opposite surfaces of the connection pad.

16. The RFID device of claim 1, wherein the RFID chip and the antenna physically contact the same surface of the connection pad.

17. The RFID device of claim 1, wherein the connection pad is deformed around the antenna at a location where the antenna crosses the connection pad.

18. The RFID device of claim 1, wherein
the RFID chip is incorporated into the RFID strap including a plastic layer and a metal layer, the metal layer comprising the connection pad, and
the plastic layer and the metal layer are deformed around the antenna at a location where the antenna crosses the RFID strap.

19. The RFID device of claim 1, where the antenna is formed of a copper wire.

20. The RFID device of claim 19, where the copper wire is plated with one or more materials, including silver or gold.

21. The RFID device of claim 1, wherein the RFID chip is disposed within the gap.

22. The RFID device of claim 1, wherein the pair of connection pads extend away from each other from opposite edges of the RFID chip.

23. The RFID device of claim 1, wherein the antenna spans the width of the connection pad at each location where the antenna crosses each connection pad.

* * * * *